(12) United States Patent
Lawin et al.

(10) Patent No.: US 7,943,234 B2
(45) Date of Patent: May 17, 2011

(54) NANOTEXTURED SUPER OR ULTRA HYDROPHOBIC COATINGS

(75) Inventors: Laurie R. Lawin, New Brighton, MN (US); Patrick Guire, Eden Prairie, MN (US); Jie Wen, Eden Prairie, MN (US); Kristin Taton, Little Canada, MN (US)

(73) Assignee: Innovative Surface Technology, Inc., St. Paul, MN (US)

( * ) Notice: Subject to any disclaimer, the term of this patent is extended or adjusted under 35 U.S.C. 154(b) by 486 days.

(21) Appl. No.: 12/037,520

(22) Filed: Feb. 26, 2008

(65) Prior Publication Data

US 2008/0268233 A1 Oct. 30, 2008

Related U.S. Application Data

(60) Provisional application No. 60/891,876, filed on Feb. 27, 2007.

(51) Int. Cl.
*B32B 5/16* (2006.01)

(52) U.S. Cl. ............ 428/323; 428/423.9; 428/327; 428/423.1

(58) Field of Classification Search .......... 428/323, 428/327, 423.1, 425.9; 524/442, 492
See application file for complete search history.

(56) References Cited

U.S. PATENT DOCUMENTS

| | | | |
|---|---|---|---|
| 5,002,582 A | 3/1991 | Guire et al. | |
| 5,202,361 A | 4/1993 | Zimmerman | |
| 6,683,126 B2 | 1/2004 | Keller et al. | |
| 6,811,856 B2 | 11/2004 | Nun et al. | |
| 6,852,389 B2 | 2/2005 | Nun et al. | |
| 6,858,284 B2 | 2/2005 | Nun et al. | |
| 7,211,313 B2 | 5/2007 | Nun et al. | |
| 2002/0016433 A1* | 2/2002 | Keller et al. | 528/10 |
| 2002/0150724 A1* | 10/2002 | Nun et al. | 428/143 |
| 2004/0234487 A1* | 11/2004 | Bremser et al. | 424/70.17 |
| 2005/0003203 A1 | 1/2005 | Brown | |
| 2006/0286305 A1 | 12/2006 | Thies et al. | |
| 2007/0009657 A1 | 1/2007 | Zhang et al. | |
| 2007/0281110 A1 | 12/2007 | Brown | |
| 2008/0026662 A1 | 1/2008 | Ramsey | |

FOREIGN PATENT DOCUMENTS

| | | |
|---|---|---|
| WO | WO 93/16131 | 8/1993 |
| WO | WO03025267 (A2) | 3/2002 |
| WO | WO 2007/011731 | 1/2007 |

OTHER PUBLICATIONS

J. Lalevee et al., "New Highly Efficient Radical Photoinitiators based on Si-Si Bond Cleavage", *Macromolecules*, 2007, American Chemical Society, 40, 8527-8530.
S. Ellefson et al., "Surface Properties of Fused Salts and Glasses: I Sessile-Drop Method for Determining Surface Tension and Density of Viscous Liquids at High Temperatures", J. Am. Ceram. Soc. 21, 193-205, (1938).
S. Wu, "Surface and Interfacial Tension of Polymer Melts", J. Colloid Interface Sci. 31, (1969), pp. 153-161.
S. Wu, "Surface and Interfacial Tension of Polymer Melts", J. Phys. Chem. 74, (1970), pp. 632-638.
R. J. Roe et al., "Polymers at Interfaces", J. Polym. Sci. C34 (1971) pp. 19-30.
Ryong-Joon Roe, "Surface Tension of Polymer Liquids", J. Phys. Chem. 72, pp. 2013-2017 (1968).
R.-J. Roe, et al., Refinement of Pendent Drop Method for the Measurement of Surface Tension of Viscous Liquid, J. Phys. Chem. 71(1967) pp. 4190-4193.
Ryong-Joon Roe et al., "Interfacial Tension Between Polymer Liquids", J. Colloid Interface Sci. 31, (1969) pp. 228-235.
J. F. Padday in Surface and Colloid Science (edited by E. Matijevic)Wiley, N.Y. 1969, pp. 101-149.
International Search Report PCT/US2008/055093 dated June 17, 2008 (3 pgs.).

\* cited by examiner

*Primary Examiner* — Jennifer C McNeil
*Assistant Examiner* — Lauren Robinson
(74) *Attorney, Agent, or Firm* — Fulbright & Jaworski L.L.P.

(57) ABSTRACT

The invention describes compositions that include a polymer having a water contact angle of between about 120° and about 150° or greater adhered to a 1 nm to about a 25 micron diameter sized particle optionally with an oxide layer. In particular, the particle is a silica and one which has been pretreated with a silane.

17 Claims, No Drawings

NANOTEXTURED SUPER OR ULTRA HYDROPHOBIC COATINGS

CROSS REFERENCE TO RELATED APPLICATIONS

This application claims benefit under 35 U.S.C. §119(e) to U.S. Provisional Patent Application Ser. No. 60/891,876, entitled "Nanotextured Super or Ultra Hydrophobic Coatings", filed Feb. 27, 2007 by Laurie R. Lawin, Patrick Guire, Jie Wen and Kristin Taton, the contents of which are incorporated herein by reference in their entirety.

FIELD OF THE INVENTION

The invention relates generally to ultra hydrophobic or super hydrophobic coatings that have a water contact angle of between about 120° and about 150° or greater. The coatings include a polymeric binder (a polymer resin) such as a polyester, a polyurethane, a polyalkylene or combinations thereof, and 1 nm to about a 25 micron diameter sized particles, optionally wherein the particle can have an oxide layer, such as a porous or non-porous silica. The compositions are useful as surface coating agents alone or in combination with other target molecules such as polymers, biomolecules and the like.

BACKGROUND OF THE INVENTION

Many applications involve the interaction of liquids with solid surfaces. Often, it is desirable to control or influence the manner of the interaction, particularly the degree of wetting of the surface, so as to achieve a specific result. As an example, surfactants are sometimes added to liquids used in cleaning processes to achieve increased surface wetting. Conversely, liquid repellent coatings are sometimes added to products to reduce surface wetting and accelerate drying of the surface.

The principles and properties affecting surface wetting have been studied for decades to understand physical/chemical interactions that effect the nature of the surface. There has been and continues to be a particular interest in surfaces that are resistant to wetting by liquids. Such surfaces are referred to as hydrophobic where the liquid is water, and lyophobic relative to other liquids. If the surface resists wetting where a small droplet of water or other liquid exhibits a very high stationary contact angle with the surface (greater than about 120 degrees), if the surface exhibits a markedly reduced propensity to retain liquid droplets, or if a liquid-gas-solid interface exists at the surface when completely submerged in liquid, the surface is generally referred to as an ultra hydrophobic or ultra lyophobic surface.

Likewise, where a small droplet of water exhibits a stationary contact angle with the surface that is greater than about 150 degrees, the surface is generally referred to as super hydrophobic.

Ultra hydrophobic and super hydrophobic surfaces are of interest in commercial and industrial applications. In nearly any process where a liquid must be dried from a surface, it is most efficient if the surface sheds the liquid without heating or extensive drying time.

Friction between the liquid and the surface is dramatically lower for an ultra hydrophobic or super hydrophobic surface as opposed to a conventional surface. As a result, ultra and super hydrophobic surfaces are extremely desirable for reducing surface friction and increasing flow in a myriad of hydraulic and hydrodynamic applications on a macro scale, and especially in microfluidic applications.

It is now understood that surface roughness has an effect on the degree of surface wetting. It has been generally observed that, under some circumstances, roughness can cause liquid to adhere more strongly to the surface than to a corresponding smooth surface. Under other circumstances, however, roughness may cause the liquid to adhere less strongly to the rough surface than the smooth surface. In some circumstances, the surface may be ultra or super hydrophobic.

The roughness, it is believed, helps to reduce the adhesion of the surface for polar liquids such as water. Roughness also appears to lead to reduced adhesion of solid deposits such as dirt particles on the surface. Under appropriate conditions, surfaces that are roughened and hydrophobic, dirt particles are flushed from the surface by moving water. This effect is referred to as the self-cleaning effect or lotus effect.

However, it has been found that most of the super or ultra hydrophobic surfaces are often formed with a delicate polymer or chemical coating that is deposited on the substrate surface. These coatings tend to be easily physically damaged so as to be not as effective as desired.

Therefore, a need exists for super or ultra hydrophobic coating compositions that are easily prepared and can withstand common usage in a given application.

BRIEF SUMMARY OF THE INVENTION

The present invention surprisingly provides unique ultra hydrophobic or super hydrophobic compositions that include a polymeric binder and small particles. The coating has a water contact angle of between about 120° and about 150° or greater than about 150°. The particles that are coated with the binder that have a diameter of between about 1 nm to about a 25 microns, optionally having an oxide layer, such as a porous or non-porous particles including, aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires. Generally inorganic particles, porous or non-porous, are pretreated with a silane to promote hydrophobicity.

In one aspect, the polymer which can serve as a binder to the particles of the coating can be crosslinked. The crosslinking of the polymer can be via internal crosslinking amongst the polymeric strands (both intra and inter polymer crosslinking) and can be accomplished, for example, via photoaddition or thermal addition such that the, generation of radicals, carbenes, or nitrenes, or cycloaddition.

The polymeric binder is generally one or a combination of one or more of a polyalkylene, polyacrylate, polymethacrylate, polyester, polyamide, polyurethane, polyvinylarylene, polyvinylarylene/alkylene copolymer, polyvinyl ester or a polyalkyleneoxide.

It should be understood that the term "polymeric binder" is a polymer that is not a prepolymer in that polymeric resins utilized in the present invention include only random reactive sites or a minimal degree of unsaturation found within the polymeric chain. A prepolymer as used herein, is a reactive low-molecular weight macromolecule or oligomer capable of further polymerization.

Generally, the polymeric binder has less than about 1% mol %, less than about 0.5% mol %, less than about 0.05% mol % and in particular less than about 0.02% mol % alkylenic reactive sites of unsaturation, e.g., vinyl double bonds.

One very unique aspect of the present invention is the discovery that polymeric binders when treated under appropriate conditions, as described herein, can crosslink. Heretofore, this was unappreciated as generally in order to polymerize or crosslink a material, a large degree of alkylenic unsaturated sites were required for reaction(s) to occur. Such sites, e.g., vinylic, are reactive and, in general, radical species can be formed at these sites to promote polymerization and crosslinking amongst other sites that are alkylenically unsaturated.

In the present application, it has been found that very little if any alkylenically unsaturated sites are required for crosslinking and that under appropriate conditions, as described herein, crosslinking can be effected by treating a polymeric binder with, for example, a radical initiator such that radicals or other reactive species are generated on or within the polymer and those species then react with other sites contained within the polymer or a second polymer strand within close proximity to the reactive site. In this manner, intramolecular crosslinking as well as intermolecular crosslinking is achieved. The combination of this crosslinking of the polymeric binder with the particles provide unique coatings as described herein.

The coating compositions of the invention have broad applications. The coating compositions can be used in surface modifications. The combination of the polymeric binder, and particle, optionally treated with silane, having a size between about 1 nm to about a 25 microns, such as silica, provides ultra or super hydrophobic coatings. This physical attribute provides that the compositions can be used where hydrophobic agents are favored.

The coating compositions of the invention can be used with a wide range of support surfaces. The compositions can be used alone or in combination with other materials to provide a desired surface characteristic. The coating compositions, alone or in combination with another material, provides the treated surface having a hydrophobic surface.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

The present invention surprisingly provides ultra hydrophobic or super hydrophobic coating compositions that include a hydrophobic polymeric binder in combination with porous or non-porous particles having a particle size of between about 1 nm to 25 micron diameter that can be used to treat surfaces. In one very surprising aspect, the polymeric binder can be inter- or intra-polymerically crosslinked. In some aspects, this crosslinked matrix provides a very durable coating.

In the specification and in the claims, the terms "including" and "comprising" are open-ended terms and should be interpreted to mean "including, but not limited to ...." These terms encompass the more restrictive terms "consisting essentially of" and "consisting of:

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The compositions of the invention are useful as coating agents. As described throughout the specification, the compositions include a polymeric resin (a binder) and a particle having a particle size between about 1 nm to about a 25 microns in diameter. In one embodiment, the particle has an oxide coating. In another aspect, the particle is pretreated with a silane. In still another aspect, the particle, with the oxide layer has been pretreated with a silane. The intent being that the particle exhibits some degree of hydrophobicity.

The particles include those particles having a particle size of between about 1 nm and about 25 micron sized particles that can be porous or non-porous particles derived from aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyhedral oligomeric silsesquioxanes, polyhedral oligomeric silicates, polyester particles, polyamide particles, polyurethane particles, ethylenically unsaturated polymer particles, polyanhydride particles and biodegradable particles such as polycaprolactone (PCL) and polylactidegly-colide (PLGA), and nanofibers, nanotubes, or nanowires and combinations thereof. Appropriate treatments of the metals, such as gold, silver, and other nobel metals and alloys are generally include use of alkylthiols, more particularly fluoroalkylthiols.

The weight ratio of particle to binder is one consideration for creating hydrophobic coatings of the invention. Depending on the density of the particles used, the ratio will vary and a person of skill in the art will adjust the ratio (weight) of the particle to binder (weight) according to the ultimate property desired. In general, coatings made of low density particles will have lower particle concentration requirements. Conversely, coatings made with higher density particles will have higher particle concentration requirements. For example, silica particle materials have varying densities, depending on porosity and the nature of the silica. In certain embodiments, the ratio of typical (e.g., silica) particles to polymeric binder is about 1:1 to about 4:1, between about 1.1:1 to about 3:1, and more particularly between about 1.2:1 and about 2:1.

Super hydrophobicity, and ultra hydrophobicity are defined as surfaces which have a water contact angle above 150° and 120°-150° respectively. In nature, lotus leaves are considered super hydrophobic. Water drops roll off the leaves collecting dirt along the way to give a "self-cleaning" surface.

This behavior is believed to be a result of nanotextured surfaces, as well as a wax layer present on the leaf. However, super hydrophobic surfaces cannot be derived from simply coating hydrophobic or oleophobic substances on surfaces, but also require nanotexture, small protrusions on the surface giving a topography on the order of 1-1000 nm. When nanotexture is added to a hydrophobic surface, water contact angles rise from 100-120° to over 150°. Not to be limited by theory, it is believed that the nanotexture produces this effect by trapping air in the spaces between structural features. Water droplets interact with both the very small hydrophobic tips of the particles and the larger valleys between particles where only air remains. Air is also highly hydrophobic. The water contacts the particle tips and does not penetrate into the air pockets. As a result the water cannot remain still on the surface and "dances" away.

The present invention provides unique compositions and methods for preparing, optionally crosslinked, super hydrophobic or ultra hydrophobic surfaces. Such surfaces may be useful for coatings for a variety of applications including automotive, RF coatings for satellite dishes, fabrics, filters, transportation, building materials, and others. There are few low cost methods of manufacturing super or ultra hydrophobic surfaces and these current methods generally lack durability. In one aspect, introduction of crosslinking amongst the polymeric binder (interpolymerically, intrapolymerically or both) and polymer-particle matrix improves durability and use time of the coatings.

The coatings of the invention can be applied to a large variety of substrates including but not limited to plastics (polyethylene, polypropylene, nylon, silicone rubber, PVC, polystyrene, polyurethane, etc.), glass, natural polymers, such as wood (cellulose), polysaccharides, proteins, paper, ceramics, metals and composites. The polymer is optimally hydrophobic (surface tension <50 mN/m) and can contain reactive groups such as double bonds, but is not required to. The nanoparticles should also be hydrophobic. The polymeric matrix entraps the nanoparticles on the surface to give the needed nanotexture. It also provides the surface hydrophobicity.

The polymeric binders useful in the invention are film forming which is meant to include polymers and low molecular mass substances which form a solid film on a surface. The binders serve, for example, to fix the particles on the surface of the substrate to be coated or to fix the particle surfaces to one another.

The hydrophobicity of the binder is characterized by its surface tension. This may be determined, for example, by measuring the static contact angle of water on a smooth surface coated with the binder. It may also be determined by the pendant drop method. Hydrophobic binders useful in the present invention have a surface tension <50 mN/m. The surface tension of commercially customary binder polymers are in some cases indicated in the literature; see, e.g. Wu et al., op. cit. p. 88 ff. and also S. Ellefson et al., J. Am. Ceram. Soc. 21, 193, (1938); S. Wu, J. Colloid Interface Sci. 31, (1969), 153, J. Phys. Chem. 74, (1970), 632, J. Polym. Sci. C34 (1971) 19; R. J. Roe et al., J. Phys. Chem. 72, 2013 (1968), J. Phys. Chem. 71 (1967) 4190, J. Colloid Interface Sci. 31, (1969) 228; and J. F. Padday in Surface and Colloid Science (edited by E. Matijevic), Wiley, N.Y. 1969, pp. 101-149, the contents of which are incorporated herein in the entirety for all purposes.

In particular, binders which have a surface energy <45 mN/m, more particularly, <40, even more particularly, <35 and in particular <30 mN/m are of interest for use with the present invention.

The binders generally comprise thermoplastic polymers which are soluble in organic solvents. The binders used may also comprise organic prepolymers which are polymerized or crosslinked by a thermal, oxidative or photochemical curing process and so form a solid coating with the powder.

Polymeric binders include, for example fatty acids having more than 8 carbon atoms, natural waxes such as beeswax, carnauba wax, wool wax, candelilla wax, and also synthetic waxes such as montanic acid waxes, montanic ester waxes, amide waxes, e.g., distearoylethylenediamine, Fischer-Tropsch waxes, and also waxlike polymers of ethylene and of propylene (polyethylene wax, polypropylene wax).

The nature of the binder is of fairly minor importance for the success of the invention, provided the binder is sufficiently hydrophobic.

For example, hydrophobic monomers useful to prepare polyalkylene polymeric binders include C2-C24 olefins, C5-C8 cycloolefins, fluoroolefins, fluorochloroolefins, vinyl aromatics, diolefins such as butadiene, isoprene and chlorobutadiene, and different monoethylenically unsaturated monomers that can contain at least one C2-C36 alkyl group.

Suitable examples of hydrophobic monomers useful to prepare polyalkylene polymeric binders include C2-C24 olefins, such as ethylene, propylene, n-butene, isobutene, n-hexene, n-octene, isooctene, n-decene, isotridecene.

Suitable examples of hydrophobic monomers useful to prepare polycylcloalkylene polymeric binders include C5-C8 cycloolefins such as cyclopentene, cyclopentadiene, cyclooctene.

Suitable examples of hydrophobic monomers useful to prepare polyvinylarylenes polymeric binders include vinyl aromatic monomers such as styrene and alpha-methylstyrene.

Suitable examples of hydrophobic monomers useful to prepare fluorinated polyalkylene polymeric binders include fluoroolefins and fluorochloroolefins such as vinylidene fluoride, chlorotrifluoroethylene and tetrafluoroethylene.

Suitable examples of hydrophobic monomers useful to prepare polyvinyl esters polymeric binders include vinyl esters of linear or branched alkane carboxylic acids having 2 to 36 carbon atoms such as vinyl acetate, vinyl propionate, vinyl n-butyrate, vinyl isobutyrate, vinyl hexanoate, vinyl octanoate, vinyl laurate and vinyl stearate Suitable examples of hydrophobic monomers useful to prepare polyacrylate and polymethacrylate polymeric binders include esters of acrylic acid and of methacrylic acid with linear or branched C1-C36 alkanols, e.g., ethyl (meth)acrylate, n-butyl(meth)acrylate, tert-butyl(meth)acrylate, n-hexyl (meth)acrylate, 2-ethylhexyl(meth)acrylate, 2-propylheptyl (meth)acrylate, lauryl (meth)acrylate and stearyl(meth)acrylate and also vinyl ethers (polyvinyl ethers) and allyl ethers (polyallylethers) of C2-C36 alkanols, such as n-butyl vinyl ether and octadecyl vinyl ether.

Still other suitable examples of hydrophobic polymeric binders useful in the invention include poly-C3-C6-alkylene oxides, such as polypropylene oxide and polybutylene oxide, polytetrahydrofuran and also polycaprolactone, polycarbonates, polyvinylbutyral, polyvinylformal, and also linear or branched polydialkylsiloxanes such as polydimethylsiloxane (silicones).

Yet still other suitable examples of hydrophobic polymeric binders include polyesters made from aliphatic or aromatic dicarboxylic acids and aliphatic and/or aromatic diols, e.g.: polyesters synthesized from aliphatic dialcohols having 2 to 18 carbon atoms, e.g., propanediol, butanediol, hexanediol, and dicarboxylic acids having 3 to 18 carbon atoms, such as adipic acid and decanedicarboxylic acid; polyesters synthesized from bisphenol A and the abovementioned dicarboxylic acids having 3 to 18 carbon atoms; and polyesters synthesized from terephthalic acid, aliphatic dialcohols having 2 to 18 carbon atoms, and dicarboxylic acids having from 3 to 18 carbon atoms.

The polyesters may optionally be terminated by long-chain monoalcohols having 4 to 24 carbon atoms, such as 2-ethyl hexanol or octadecanol. Furthermore, the polyesters may be terminated by long-chain monocarboxylic acids having 4 to 24 carbon atoms, such as stearic acid.

Other suitable examples of hydrophobic polymeric binders include polyamides made from aliphatic or aromatic dicarboxylic esters or acid halides and aliphatic and/or aromatic amines, e.g.: polyesters synthesized from aliphatic diamines having 2 to 18 carbon atoms, e.g., propanediamine, butanediamine, hexanediamine, and dicarboxylic esters or acid halides having 3 to 18 carbon atoms, such as adipic acid esters and decanedicarboxylic acid diesters; polyamides synthesized from bisphenylamine A and the above-mentioned dicarboxylic esters having 3 to 18 carbon atoms; and polyesters synthesized from terephthalic esters, aliphatic diaamines having 2 to 18 carbon atoms, and dicarboxylic esters having from 3 to 18 carbon atoms.

The polyamides may optionally be terminated by long-chain monoalcohols or monoamines having 4 to 24 carbon atoms, such as 2-ethyl hexanol or octadecanol. Furthermore, the polyamides may be terminated by long-chain monocarboxylic acids having 4 to 24 carbon atoms, such as stearic acid.

As used herein, the term "polyurethane/polyurea" refers to a polymer containing urethane linkages, urea linkages or combinations thereof. Typically, such polymers are formed by combining diisocyanates with alcohols and/or amines. For example, combining isophorone diisocyanate with a diol and a diamine under polymerizing conditions provides a polyurethane/polyurea composition having both urethane (carbamate) linkages and urea linkages. Such materials are typically prepared from the reaction of a diisocyanate and a polymer having a reactive portion (diol, diamine or hydroxyl and amine), and optionally, a chain extender.

Suitable diisocyanates include both aromatic and aliphatic diisocyanates. Examples of suitable aromatic diisocyanates include toluene diisocyanate, 4,4'-diphenylmethane diisocyanate, 3,3'-dimethyl-4,4'-biphenyl diisocyanate, naphthalene diisocyanate and paraphenylene diisocyanate. Suitable aliphatic diisocyanates include, for example, 1,6-hexamethylene diisocyanate (HDI), trimethylhexamethylene diisocyanate (TMDI), trans-1,4-cyclohexane diisocyanate (CHDI), 1,4-cyclohexane bis(methylene isocyanate) (BDI), 1,3-cyclohexane bis(methylene isocyanate), isophorone diisocyanate (IPDI) and 4,4'-methylenebis(cyclohexyl isocyanate). A number of these diisocyanates are available from commercial sources such as Aldrich Chemical Company Milwaukee, Wis., USA) or can be readily prepared by standard synthetic methods using literature procedures.

The alcoholic or amine containing polymer can be a diol, a diamine or a combination thereof. The diol can be a poly (alkylene)diol, a polyester-based diol, or a polycarbonate diol. As used herein, the term "poly(alkylene)diol" refers to polymers of alkylene glycols such as poly(ethylene)diol, poly (propylene)diol and polytetramethylene ether diol. The term "polyester-based diol" refers to a polymer in which the R group is a lower alkylene group such as ethylene, 1,3-propylene, 1,2-propylene, 1,4-butylene, 2,2-dimethyl-1,3-propylene, and the like. One of skill in the art will also understand that the diester portion of the polymer can also vary. For example, the present invention also contemplates the use of succinic acid esters, glutaric acid esters and the like. The term "polycarbonate diol" refers those polymers having hydroxyl functionality at the chain termini and ether and carbonate functionality within the polymer chain. The alkyl portion of the polymer will typically be composed of C2 to C4 aliphatic radicals, or in some embodiments, longer chain aliphatic radicals, cycloaliphatic radicals or aromatic radicals. The term diamines refers to any of the above diols in which the terminal hydroxyl groups have been replaced by reactive amine groups or in which the terminal hydroxyl groups have been derivatized to produce an extended chain having terminal amine groups. These polymers can be obtained from Aldrich Chemical Company. Alternatively, literature methods can be employed for their synthesis.

The amount of alcoholic or amino polymer which is used in the present compositions will typically be about 10% to about 100% by mole relative to the diisocyanate which is used. Preferably, the amount is from about 50% to about 90% by mole relative to the diisocyanate. When amounts less than 100% of polymer are used, the remaining percentage (up to 100%) will be a chain extender.

In certain embodiments, the polymeric polyurethane binders will also contain a chain extender which is an aliphatic or aromatic diol, an aliphatic or aromatic diamine, alkanolamine, or combinations thereof. Examples of suitable aliphatic chain extenders include ethylene glycol, propylene glycol, 1,4-butanediol, 1,6-hexanediol, ethanolamine, ethylene diamine, butane diamine, 1,6-hexamethylenediamine, 1,2-diaminocyclohexane or isophorone diamine and 1,4-cyclohexanedimethanol. Aromatic chain extenders include, for example, para-di(2-hydroxyethoxy)benzene, meta-di(2-hydroxyethoxy)benzene, (2,4-diamino-3,5-di(methylthio)toluene), 3,3'-dichloro-4,4'diaminodiphenylmethane, trimethylene glycol bis(para-aminobenzoate)ester and methylenedianiline. In one aspect, the chain extender is present an amount of from about 10% to 50% by mole relative to the diisocyanate.

Cellulosic binders are also useful polymers in this invention. Suitable cellulose polymers include, methyl cellulose, ethyl cellulose, hydroxymethyl cellulose, hydroxyethyl cellulose, hydroxypropyl cellulose, cellulose acetate, and cyanoethylated cellulose.

Other suitable polymeric binders include, for example, homo and copolymers of polyacrylonitriles, polymethacrylonitriles, poly(alkyl)acrylates, polyesters, polyurethanes, polycyanoacrylates, polycyanomethacrylates, poly (ethylene-propylene), polybutadienes, poly(cis-1,4-isoprenes), poly(trans-1,4-isoprenes), polychloroprenes (neoprene), poly(vinyl chlorides), poly(vinyl fluorides), poly(vinylidine chlorides), poly(vinylidine fluorides), poly(chlorotrifluoroethylene-vinylidine fluoride), poly(tetrafluoro-ethylene-hexafluoropropylene), poly(vinyl acetates), poly(methylvinylethers), poly(isobutyl vinyl ethers), poly(vinyl)laurates, poly(vinyl)stearates, poly(vinyl)neodecanoates, poly(vinyl-neononanoates), polyvinyl alcohols, poly(vinylbutyrals), poly(methyl vinyl ketones), poly(vinylpyrrolidones), poly (N-vinylcarbazoles), poly(acrylonitrile-butadienes), poly (acrylonitrile-butadiene-styrenes), poly(acrylonitrile-vinyl chlorides), poly(styrene-butadienes), polystyrenes, poly(styrene-alpha-methylstyrenes), polyethylene-vinylacetate polymers, poly(vinylidine fluoride-hexafluoropropylene), poly (vinyl chloride-vinyl acetates), poly(phenol-formaldehyde) resins, poly(imino(1-oxoundecamethylenes), poly(iminoadipoyl iminohexamethylenes), poly(hexamethylene adipamide)s, poly(hexamethylene sebacamide)s, poly(hexamethylene dodecanediamides), poly(iminoadipoylimino-tetramethylenes), poly(butyleneadipides), poly (iminoadipoyliminopentamethylenes), poly(pentaleneadipides) poly(amides), poly(imino-1-oxotetramethylenes), (polypyrrolidinones), poly[imino(1-oxo-2,2-dimethyl-3-phenyltrimethylene)]poly(amides), poly(lysine-co-lactic acid) (1:19) poly(amides), poly(aspartic acid-co-lactic acid) (1:9) poly(amides). poly(ethylene terephthalates), poly(butylene terephthalates), poly(4,4'-carbonato-2,2-diphenylpropanes), PLGA/PLLA, poly(ethylene oxides), poly(ethyleneglycol methacrylates), polytetrahydrofurans, poly(tetramethylene ether glycols), poly(epichlorohydrins), poly(epichlorohydrin-ethylene oxides), poly(butylene glycols), polyformaldehydes, poly(phenylene sulfides), poly(trimethylene sulfides), poly(ether ether ketones), poly(iminocarbonyl-phenylethylidenes), poly-L-phenylalanines, polyphosphazenes, poly[bis(trifluoroethoxy)-polyphosphazenes, poly[bis(trifluoroethoxy)-phosphazenes], poly(dimethylsiloxane-co-diphenylsiloxanes), poly(dimethylsiloxanes) (silicone rubber), poly(melamine-formaldehydes), poly(urea-formaldehyde) resins and Udel polysulfone, poly(oxy-1,4-cyclohexyleneoxycarbonylimino-1,4-phenylenemethylene-1,4-phenylene-iminocarbonyls), polycarbonates, polyanhydrides and polyorthoesters.

The weight-average molecular weight of the polymeric binders may vary over a wide range and is generally in the range from 1000 to 30 million g/mol and preferably in the range from 2500 to 6 million, in particular 2500 to 5 million.

The polymeric binders useful in the invention can be crosslinked. Crosslinking can be between individual polymeric strands (interpolymeric crosslinking) or can be between portions of the same polymeric strand (intrapolymeric crosslinking) or both. Additionally, the crosslinking reaction may also provide covalent bonding to the surface of the substrate.

It should be understood that the term "crosslinking" as used herein is intended to mean that the crosslinking occurs between the polymer strands or polymer strand alone and not that a separate second reactive reactive group is required. This is intended to exclude traditional crosslinkers where the crosslinker has two or more reactive sites that upon activation interact with one or more prepolymers or polymers.

As discussed above, the present invention surprisingly incorporates the unique discovery that generation of radicals or other reactive species of the polymeric binder in combination with particles (having a size between about 1 nm and about 25 microns) result in a coating that is durable, ultra hydrophobic or super hydrophobic and inter- or intramolecularly crosslinked. The crosslinking occurs among polymer strands, chains, particles, etc. wherein the polymer does not have any, or very minimal, sites of unsaturation. Therefore, it is believed, that in many cases the radicals or reactive species are generated at saturated sites within the polymer and subsequently react with other sites that are susceptible to these reactive species.

Not to be limited by theory, the coatings of the invention adhere to the surface of the substrate. It is unknown whether the adhesion is from covalent or ionic attachment, or if any physical attachment actually occurs. However, it has been found that treatment of the coatings where inter- or intrapolymeric crosslinking is accomplished (such as thermal, photoactivation (photopolymerization), radical generation, etc.) often provides a more durable coating that is not easily removed. In one aspect, it is possible that during the treatment process the polymeric binder may adhere to the particles and/or the surface of a substrate by one or more physical interactions, such as covalent bonding, ionic attachment, hydrophobic/hydrophobic interactions, etc.

Photopolymerization can be defined as a phenomenon whereby individual substances are joined together to create a new larger structure by way of the action of light. When light is absorbed, electrons populate excited states in molecules. These excited states are generally quite short-lived and terminate by one of three pathways. The excited state can emit a photon from either a singlet state (fluorescence) or a triplet state (phosphorescence), lose its energy via vibrations in the form on heat, or react chemically. Because the absorption of a photon highly excites a molecule, there is a much wider variety of reactions possible than standard thermochemical means. Photocrosslinking uses these reactions to join small to molecules to other small molecules, large molecules to small molecules, and large molecules to each other (photocoupling of polymers), as well as large and small molecules to substrates or particles (photobonding to surfaces). During photocrosslinking each increase in molecular weight is initiated by its own photochemical reaction and the coupling of radicals can result in the formation of crosslinks, especially in the solid state. The crosslinking is generally between pre-existing polymer chains and includes polycondensation, which is also referred to as step growth polymerization. Photocrosslinking can usually be classified into two types.

The first type is where crosslinks are formed by the direct reaction of an excited molecule. Representative reactions would be a photo 2+2 cycloaddition (or 4+4) and cis-trans isomerization of double bonds. Examples of this type are demonstrated by the cyclodimerization of cinnamic acid and derivatives, chalcones and stilbenes, anthracenes, maleimides and strained cycloalkenes. In another large class of reactions, the triplet, $T_1$ excited state of carbonyl groups in ketones can result in either fragmentation (Norrish Type I reaction) or hydrogen abstraction (Norrish type II reaction). Both of these photoreactions create two radicals which can then subsequently react with surrounding molecules. For example, aromatic ketones, such as benzophenone, readily undergo hydrogen abstraction reactions with any preformed polymer possessing C—H bonds. A possible mechanism is shown in the Scheme which follows.

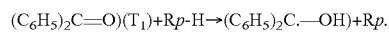

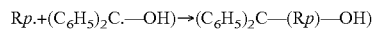

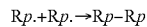

The second usual type of photocrosslinking is where crosslinks occur through the action of a photogenerated reactive species. Examples of the second type include the use of nitrenes that are formed from organic azides and carbenes.

Whether through direct excited state reaction or reactive intermediates, photolysis of photoreactive groups can begin a process of bond formation throughout a mixture. In most cases this will be a solid mixture of polymers, particles, and photoreactive groups designed to give a nanotextured surface. The act of cross linking will serve to increase the durability of this surface. Bonds will be formed between the polymer itself, between polymer and polymer, and the between the surface of the substrate and/or particles. Bond formation may take place by many means within the various systems. In many cases radicals are formed through photolysis. Radicals can form new bonds through radical-radical recombination, addition to unsaturated bonds, hydrogen abstraction and subsequent recombination or addition, further fragmentation, oxygen addition, or disproportionation, as well as possible electron transfer reactions. Similarly, photoreactive polymeric species can be bonded to the surface of the substrate or the particles. All of these newly formed covalent bonds increase the durability and stability of the matrix. In cases which generate carbenes and nitrenes, bonds would be formed typically by insertion, hydrogen abstraction to form radicals, rearrangements, etc. The excited states of some dienes and other unsaturated compounds may directly react with relevant groups on a polymer chain, as when cinnamic acid forms a 2+2 photoadduct with polybutadiene or other polymer (or surface) containing double bonds. The invention is not limited to these mechanisms, and in fact, many mechanisms may be at work within one polymer-particle-photoreactive cross linking group matrix.

Photoreactive species are as described herein, and are sufficiently stable to be stored under conditions in which they retain such properties. See, e.g., U.S. Pat. No. 5,002,582, the disclosure of which is incorporated herein by reference. Latent reactive groups can be chosen that are responsive to various portions of the electromagnetic spectrum, with those responsive to ultraviolet, infrared and visible portions of the spectrum (referred to herein as "photoreactive").

Photoreactive groups respond to external stimuli and undergo active specie generation with the formation of a covalent bond to an adjacent chemical structure, e.g., as provided by the same or a different molecule. Photoreactive groups are those groups of atoms in a molecule that retain their covalent bonds during storage but, upon activation by an external energy source, form covalent bonds with other molecules.

Photoreactive groups generate active species such as free radicals and particularly nitrenes, carbenes, and excited states of ketones upon absorption of electromagnetic energy. Photoreactive groups can be chosen to be responsive to various portions of the electromagnetic spectrum, and photoreactive species that are responsive to electromagnetic radiation, including, but not limited to ultraviolet, infrared and visible portions of the spectrum, are referred to as a "photochemical group" or "photogroup."

Free radical photoreactive groups can be classified by the following two types.

Type A. Compounds directly produce radicals by unimolecular fragmentation after light absorption. The radicals result from a homolytic or heterolytic cleavage of a sigma bond inside the molecule itself. Common examples include but are not limited to peroxides, and peroxy compounds, benzoin derivatives (including ketoxime esters of benzoin), acetophenone derivatives, benzilketals, α-hydroxyalkylphenones and α-aminoalkylphenones, O-acyl α-oximinoketones, acylphosphine oxides and acylphosphonates, thiobenzoic S-esters, azo and azide compounds, triazines and biimidazoles.

Type B. Compounds generate free radicals by bimolecular hydrogen abstraction after light absorption. The hydrogen abstraction photoreactive group enters an excited state and undergo an intermolecular reaction with a hydrogen donor to generate free radicals. This leads to the formation of a pair of radicals originating from two different molecules. The coupling of radicals can be used to form crosslinks, especially in the solid state in the absence of solvents. Common examples include but are not limited to the following chemical classes. Quinones, benzophenones, xanthones and thioxanthones, ketocoumarins, aromatic 1,2 diketones and phenylglyoxylates. Hydrogen abstraction reactions can also occur intramolecularly. The reactions are not effective for the direct initiation of polymerization and are used internally for the formation of an intermediate. This intermediate may be effective for further cross linking depending on its structure.

The photolysis of organic azides has been shown to result in $N_2$ loss, producing nitrenes as reactive intermediates. Nitrenes are known to undergo five general reactions. 1) Addition to double bonds is observed for both singlet and triplet nitrenes which in the case of arylnitrenes results in rearrangement of the aziridine to a secondary amine as a conceivable mechanism. 2) Insertion of a nitrene into a carbon-hydrogen bond to give a secondary amine which is observed for singlet nitrenes. 3) Hydrogen abstraction is the most common reaction of triplet nitrenes in solution where the formed amino radical and carbon radical generally diffuse apart and the amino radical abstracts a second hydrogen atom to give a primary amine. 4) Nitrene dimerization 5) Attack on heteroatom, for example nitrenes react with azides and oxygen.

Upon direct excitation the homolytic cleavage of one of the carbon-chlorine bonds of a trichloromethyl group occurs yielding a radical pair. The highly reactive chlorine atom formed in this reaction abstracts a hydrogen atom to form a carbon radical and hydrogen chloride. Suitable examples include di- or trichlroacetophenones, such as p-ter-butyl trichloroacetophenone.

The use of photoreactive groups in the form of photoreactive aryl ketones are useful such as acetophenone, benzophenone, anthraquinone, anthrone, and anthrone-like heterocycles (i.e., heterocyclic analogs of anthrone such as those having N, O, or S in the 10-position), or their substituted (e.g., ring substituted) derivatives. Examples of aryl ketones include heterocyclic derivatives of anthrone, including acridone, xanthone, and thioxanthone, and their ring substituted derivatives. In particular, thioxanthone, and its derivatives, having excitation energies greater than about 360 nm are useful.

The photoreactive groups of such ketones are preferred since they are readily capable of undergoing an activation/inactivation/reactivation cycle. Benzophenone, acetophenone and anthraquinone are examples of photoreactive moieties, since they are capable of photochemical excitation with the initial formation of an excited singlet state that undergoes intersystem crossing to the triplet state. The excited triplet state can insert into carbon-hydrogen bonds by abstraction of a hydrogen atom (from a support surface, for example), thus creating a radical pair. Subsequent collapse of the radical pair leads to formation of a new carbon-carbon bond. If a reactive bond (e.g., carbon-hydrogen) is not available for bonding, the ultraviolet light-induced excitation of the benzophenone, acetophenone or anthraquinone group is reversible and the molecule returns to ground state energy level upon removal of the energy source. Photoactivatible aryl ketones such as benzophenone, anthraquinone and acetophenone are of particular importance inasmuch as these groups are subject to multiple reactivation in water and hence provide increased coating efficiency.

Another class of photoreactive groups includes compounds having an Si—Si bond, wherein it is believe the Si—Si bond is broken upon excitation with a light source, such as with a laser or UV light. The radicals generated upon the bond breakage provide for reactive sites suitable for use with the present invention. (For examples of Si—Si bond cleavage, see J. Lalevee, M. El-Roz, F. Morlet-Savery, B. Graff, X. Allonas and J. P. Fouassier, "New Highly efficient Radical Photoinitiators based on Si—Si Cleavage" Macromolecules, 2007, 40, 8527-8530 which describes 10,10'-bis (10-phenyl-10H-phenoxasilin (Sigma-Aldrich, St. Louis Mo.) and 9,9'-dimethyl-9,9'-bis-(9H-9-silafluorene, the contents of which are incorporated herein in their entirety.)

Thermal polymerization can be defined as a phenomenon whereby individual substances are joined together to create larger structures by the action of heat. Numerous substances decompose to free radicals when heated. If the decomposition temperature corresponds to a convenient temperature range the substance may be useful in reactions to join small molecules to other small molecules, large molecules to small molecules and large molecules to each other (thermal coupling of polymers), as well as large and small molecules to substrates or particles (thermal bonding to surfaces). Useful thermal initiators include organic peroxides, redox reagents, organic hydroperoxides, azo compounds, metal alkyls and organometallic reagents.

Dialkyl, diacyl and hydrogen peroxides decompose thermally by cleavage of the oxygen bond to yield two alkoxy radicals. Azo compounds decompose thermally to give nitrogen and two alkyl radicals. The radicals may then initiate reactions as described in photopolymerization free radical reactions.

Crosslinking can also be induced by high energy ionizing radiation such as X-rays, gamma rays, alpha particles or high energy electrons or protons. The absorption of energy is less selective and more complicated when ionizing radiation is used then when light is used.

"Alkyl" by itself or as part of another substituent refers to a saturated or unsaturated branched, straight-chain or cyclic monovalent hydrocarbon radical having the stated number of carbon atoms (i.e., C1-C6 means one to six carbon atoms) that is derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl, cycloprop-1-en-1-yl; cycloprop-2-en-1-yl, prop-1-yn-1-yl, prop-2-yn-1-yl, etc.; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl, etc.; and the like. Where specific levels of saturation are intended, the nomenclature "alkanyl," "alkenyl" and/or "alkynyl" is used, as defined below. "Lower alkyl" refers to alkyl groups having from 1 to 6 carbon atoms.

"Alkanyl" by itself or as part of another substituent refers to a saturated branched, straight-chain or cyclic alkyl derived by the removal of one hydrogen atom from a single carbon atom of a parent alkane. Typical alkanyl groups include, but are not limited to, methanyl; ethanyl; propanyls such as propan-1-yl, propan-2-yl(isopropyl), cyclopropan-1-yl, etc.; butanyls such as butan-1-yl, butan-2-yl(sec-butyl), 2-methyl-propan-1-yl(isobutyl), 2-methyl-propan-2-yl(t-butyl), cyclobutan-1-yl, etc.; and the like.

"Alkenyl" by itself or as part of another substituent refers to an unsaturated branched, straight-chain or cyclic alkyl having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl, prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, etc.; and the like.

"Alkyloxyalkyl" refers to a moiety having two alkyl groups tethered together via an oxygen bond. Suitable alkyloxyalkyl groups include polyoxyalkylenes, such as polyethyleneoxides, polypropyleneoxides, etc. that are terminated with an alkyl group, such as a methyl group. A general formula for such compounds can be depicted as R'—(OR")$_n$ or (R'O)$_n$—R" wherein n is an integer from 1 to about 10, and R' and R" are alkyl or alkylene groups.

"Alkynyl" by itself or as part of another substituent refers to an unsaturated branched, straight-chain or cyclic alkyl having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, etc.; and the like.

"Alkyldiyl" by itself or as part of another substituent refers to a saturated or unsaturated, branched, straight-chain or cyclic divalent hydrocarbon group having the stated number of carbon atoms (i.e., C1-C6 means from one to six carbon atoms) derived by the removal of one hydrogen atom from each of two different carbon atoms of a parent alkane, alkene or alkyne, or by the removal of two hydrogen atoms from a single carbon atom of a parent alkane, alkene or alkyne. The two monovalent radical centers or each valency of the divalent radical center can form bonds with the same or different atoms. Typical alkyldiyl groups include, but are not limited to, methandiyl; ethyldiyls such as ethan-1,1-diyl, ethan-1,2-diyl, ethen-1,1-diyl, ethen-1,2-diyl; propyldiyls such as propan-1,1-diyl, propan-1,2-diyl, propan-2,2-diyl, propan-1,3-diyl, cyclopropan-1,1-diyl, cyclopropan-1,2-diyl, prop-1-en-1,1-diyl, prop-1-en-1,2-diyl, prop-2-en-1,2-diyl, prop-1-en-1,3-diyl, cycloprop-1-en-1,2-diyl, cycloprop-2-en-1,2-diyl, cycloprop-2-en-1,1-diyl, prop-1-yn-1,3-diyl, etc.; butyldiyls such as, butan-1,1-diyl, butan-1,2-diyl, butan-1,3-diyl, butan-1,4-diyl, butan-2,2-diyl, 2-methyl-propan-1,1-diyl, 2-methyl-propan-1,2-diyl, cyclobutan-1,1-diyl; cyclobutan-1,2-diyl, cyclobutan-1,3-diyl, but-1-en-1,1-diyl, but-1-en-1,2-diyl, but-1-en-1,3-diyl, but-1-en-1,4-diyl, 2-methyl-prop-1-en-1,1-diyl, 2-methanylidene-propan-1,1-diyl, buta-1,3-dien-1,1-diyl, buta-1,3-dien-1,2-diyl, buta-1,3-dien-1,3-diyl, buta-1,3-dien-1,4-diyl, cyclobut-1-en-1,2-diyl, cyclobut-1-en-1,3-diyl, cyclobut-2-en-1,2-diyl, cyclobuta-1,3-dien-1,2-diyl, cyclobuta-1,3-dien-1,3-diyl, but-1-yn-1,3-diyl, but-1-yn-1,4-diyl, buta-1,3-diyn-1,4-diyl, etc.; and the like. Where specific levels of saturation are intended, the nomenclature alkanyldiyl, alkenyldiyl and/or alkynyldiyl is used. Where it is specifically intended that the two valencies be on the same carbon atom, the nomenclature "alkylidene" is used. A "lower alkyldiyl" is an alkyldiyl group having from 1 to 6 carbon atoms. In preferred embodiments the alkyldiyl groups are saturated acyclic alkanyldiyl groups in which the radical centers are at the terminal carbons, e.g., methandiyl (methano); ethan-1,2-diyl(ethano); propan-1,3-diyl(propano); butan-1,4-diyl (butano); and the like (also referred to as alkylenes, defined infra).

"Alkylene" by itself or as part of another substituent refers to a straight-chain saturated or unsaturated alkyldiyl group having two terminal monovalent radical centers derived by the removal of one hydrogen atom from each of the two terminal carbon atoms of straight-chain parent alkane, alkene or alkyne. The locant of a double bond or triple bond, if present, in a particular alkylene is indicated in square brackets. Typical alkylene groups include, but are not limited to, methylene (methano); ethylenes such as ethano, etheno, ethyno; propylenes such as propano, prop[1]eno, propa[1,2]dieno, prop[1]yno, etc.; butylenes such as butano, but[1]eno, but[2]eno, buta[1,3]dieno, but[1]yno, but[2]yno, buta[1,3]diyno, etc.; and the like. Where specific levels of saturation are intended, the nomenclature alkano, alkeno and/or alkyno is used. In preferred embodiments, the alkylene group is (C1-C6) or (C1-C3) alkylene. Also preferred are straight-chain saturated alkano groups, e.g., methano, ethano, propano, butano, and the like.

"Aryl" by itself or as part of another substituent refers to a monovalent aromatic hydrocarbon group having the stated number of carbon atoms (i.e., C5-C15 means from 5 to 15 carbon atoms) derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexylene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like, as well as the various hydro isomers thereof. In preferred embodiments, the aryl group is (C5-C15) aryl, with (C5-C10) being even more preferred. Particularly preferred aryls are phenyl and naphthyl.

"Arylalkyl" by itself or as part of another substituent refers to an acyclic alkyl radical in which one of the hydrogen atoms bonded to a carbon atom, typically a terminal or $sp^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl and/or arylalkynyl is used. Preferably, an arylalkyl group is (C7-C30) arylalkyl, e.g., the alkanyl, alkenyl or alkynyl moiety of the arylalkyl group is (C1-C10) and the aryl moiety is (C6-C20), more preferably, an arylalkyl group is (C7-C20) arylalkyl, e.g., the alkanyl, alkenyl or alkynyl moiety of the arylalkyl group is (C1-C8) and the aryl moiety is (C6-C12).

"Aryloxyalkyl" refers to a moiety having an aryl group and an alkyl group tethered together via an oxygen bond. Suitable aryloxyalkyl groups include phenyloxyalkylenes, such as methoxyphenyl, ethoxyphenyl, etc.

"Cycloalkyl" by itself or as part of another substituent refers to a cyclic version of an "alkyl" group. Typical cycloalkyl groups include, but are not limited to, cyclopropyl; cyclobutyls such as cyclobutanyl and cyclobutenyl; cyclopentyls such as cyclopentanyl and cycloalkenyl; cyclohexyls such as cyclohexanyl and cyclohexenyl; and the like.

"Cycloheteroalkyl" by itself or as part of another substituent refers to a saturated or unsaturated cyclic alkyl radical in which one or more carbon atoms (and any associated hydrogen atoms) are independently replaced with the same or different heteroatom. Typical heteroatoms to replace the carbon atom(s) include, but are not limited to, N, P, O, S, Si, etc. Where a specific level of saturation is intended, the nomenclature "cycloheteroalkanyl" or "cycloheteroalkenyl" is used. Typical cycloheteroalkyl groups include, but are not limited to, groups derived from epoxides, imidazolidine, morpholine, piperazine, piperidine, pyrazolidine, pyrrolidine, quinuclidine, and the like.

"Halogen" or "Halo" by themselves or as part of another substituent, unless otherwise stated, refer to fluoro, chloro, bromo and iodo.

"Haloalkyl" by itself or as part of another substituent refers to an alkyl group in which one or more of the hydrogen atoms are replaced with a halogen. Thus, the term "haloalkyl" is meant to include monohaloalkyls, dihaloalkyls, trihaloalkyls, etc. up to perhaloalkyls. For example, the expression "(C1-C2) haloalkyl" includes fluoromethyl, difluoromethyl, trifluoromethyl, 1-fluoroethyl, 1,1-difluoroethyl, 1,2-difluoroethyl, 1,1,1-trifluoroethyl, perfluoroethyl, etc.

"Heteroalkyl, Heteroalkanyl, Heteroalkenyl, Heteroalkynyl" by itself or as part of another substituent refer to alkyl, alkanyl, alkenyl and alkynyl radical, respectively, in which one or more of the carbon atoms (and any associated hydrogen atoms) are each independently replaced with the same or different heteroatomic groups. Typical heteroatomic groups include, but are not limited to, —O—, —S—, —O—O—, —S—S—, —O—S—, —NR'—, =N—N=, —N=N—, —N=N—NR'—, —PH—, —P(O)$_2$—, —O—P(O)$_2$—, —S(O)—, —S(O)$_2$—, —SnH$_2$— and the like, where R' is hydrogen, alkyl, substituted alkyl, cycloalkyl, substituted cycloalkyl, aryl or substituted aryl.

"Heteroaryl" by itself or as part of another substituent, refers to a monovalent heteroaromatic radical derived by the removal of one hydrogen atom from a single atom of a parent heteroaromatic ring system. Typical heteroaryl groups include, but are not limited to, groups derived from acridine, arsindole, carbazole, β-carboline, benzoxazine, benzimidazole, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. Preferably, the heteroaryl group is from 5-20 membered heteroaryl, more preferably from 5-10 membered heteroaryl. Preferred heteroaryl groups are those derived from thiophene, pyrrole, benzothiophene, benzofuran, indole, pyridine, quinoline, imidazole, oxazole and pyrazine.

"Heteroarylalkyl" by itself or as part of another substituent refers to an acyclic alkyl group in which one of the hydrogen atoms bonded to a carbon atom, typically a terminal or $sp^3$ carbon atom, is replaced with a heteroaryl group. Where specific alkyl moieties are intended, the nomenclature heteroarylalkanyl, heteroarylakenyl and/or heteroarylalkynyl is used. In preferred embodiments, the heteroarylalkyl group is a 6-21 membered heteroarylalkyl, e.g., the alkanyl, alkenyl or alkynyl moiety of the heteroarylalkyl is (C1-C6) alkyl and the heteroaryl moiety is a 5-15-membered heteroaryl. In particularly preferred embodiments, the heteroarylalkyl is a 6-13 membered heteroarylalkyl, e.g., the alkanyl, alkenyl or alkynyl moiety is (C1-C3) alkyl and the heteroaryl moiety is a 5-10 membered heteroaryl.

"Hydroxyalkyl" by itself or as part of another substituent refers to an alkyl group in which one or more of the hydrogen atoms are replaced with a hydroxyl substituent. Thus, the term "hydroxyalkyl" is meant to include monohydroxyalkyls, dihydroxyalkyls, trihydroxyalkyls, etc.

"Parent Aromatic Ring System" refers to an unsaturated cyclic or polycyclic ring system having a conjugated 7 electron system. Specifically included within the definition of "parent aromatic ring system" are fused ring systems in which one or more of the rings are aromatic and one or more of the rings are saturated or unsaturated, such as, for example, fluorene, indane, indene, phenalene, tetrahydronaphthalene, etc. Typical parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexylene, indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, tetrahydronaphthalene, triphenylene, trinaphthalene, and the like, as well as the various hydro isomers thereof.

"Parent Heteroaromatic Ring System" refers to a parent aromatic ring system in which one or more carbon atoms (and any associated hydrogen atoms) are independently replaced with the same or different heteroatom. Typical heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Typical parent heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

The compositions of the invention that can be used as coating agents include one or more moieties that render the molecule hydrophobic in nature.

The coating compositions of the invention can be prepared by mixing the polymeric binder and particles together. The order of addition does not matter. Generally a non-reactive solvent can be used to help dilute the components in order to help reduce the viscosity of the coating composition.

The compositions of the invention can be applied to a surface of interest in any suitable manner. For example, the composition can be applied by dip coating or by dispersing the compound on the surface (for example, by spray coating). Suitable methods of application include application in solution, dipping, spray coating, knife coating, and roller coating. In one aspect, the compound is applied to the surface via spray coating, as this application method provides increased density of the compound on the support surface, thereby improving durability.

Plastics such as polyolefins, polystyrenes, poly(methyl) methacrylates, polyacrylonitriles, poly(vinylacetates), poly (vinyl alcohols), chlorine-containing polymers such as poly (vinyl) chloride, polyoxymethylenes, polycarbonates, polyamides, polyimides, polyurethanes, phenolics, aminoepoxy resins, polyesters, silicones, cellulose-based plastics, and rubber-like plastics can all be used as substrate, providing surfaces that can be modified as described herein. See generally, "Plastics", pp. 462-464, in Concise Encyclopedia of Polymer Science and Engineering, Kroschwitz, ed., John Wiley and Sons, 1990, the disclosure of which is incorporated herein by reference. In addition, substrates such as those formed of pyrolytic carbon, parylene coated surfaces, and silylated surfaces of glass, ceramic, or metal are suitable for surface modification.

As described above, the particle can be virtually any type of particle that has a particle size of between about 1 nm and about 25 microns and up to 1000 nm). The particle can be porous or non-porous. Generally, the particle has an oxide layer but in particular has been treated with a silane reagent to provide hydrophobicity. Suitable materials include, but are not limited to, particles derived from aluminum oxides (alumina), titanium oxide, zirconium oxide, gold (treated with organo thiols), silver (organo thiol or silane treated), nickel, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires and combinations thereof.

The particles may also be used to give properties to the surface other than hydrophobicity. For example, inclusion of silver particles may give anti-bacterial properties to the surface. Silver has long been known to have broad spectrum antimicrobial properties. The silver cation binds to thiols and other groups, denaturing proteins. When bound to proteins in the bacterial cell wall, rupture can ensue, killing the bacteria. Silver may also bind respiratory enzymes and DNA leading to further cell death. Its use in the particle aspect of these matrices may provide additional benefits beyond texture. Similarly, gold nanoparticles may give effects common to gold nanoparticles such as fluorescence quenching or surface plasmon resonance. Polymer matrix coatings may be tailored with these additional features in mind.

As noted throughout the specification, the particle can be pretreated with a silane to help increase hydrophobicity of the ultimate composition. Silanation of surfaces is known in the art. Generally, any hydrophobic silane that can react with a surface can be used with the particles described herein For example, Cab-O—Sil TS 720 (Cabot, a silica product, uses a dimethyl silicone (polydimethylsiloxane) according to the MSDS. Other silanating agents used on Cab-O—Sil products include hexamethyldisilazane and dichlorodimethylsilane. Similar silica products are available from Degussa (www.degussa.com, Duesseldorf, Germany), under their Aerosil R and LE lines that are silanated with various silane reagents, including octamethylcyclotetrasiloxane.

Not to be limited by the following, it is possible to treat uncoated particles using a solution or gas phase reaction to obtain silanized particles. A long chain alkanesilane, such as octadecyltrichlorosilane, decyltrichlorosilane, etc. can be used. The chain length can be varied from about 1 to 20, though the 18 is very common. Additionally there are aryl silanes, such as tolyldimethylchlorosilane, phenyltrichlorosilane, etc. and fluoroalkylsilanes like heptadecafluorodecyltrichlorosilane (fluorosilanes) having the same chain length range as straight alkyl chains, with complete or almost complete fluorination.

The silanes react with the particle surface through reactive groups, such as chloro groups (mono, di, and tri-chloro) or through alkoxy groups (mono-methoxy, di-methoxy, trimethoxy or ethoxy versions typically). They can have one, two, or three chains, though it is more common to have one chain, and one or two methyl groups. Such silanes are sold commercially from Gelest Inc., Morrisville, Pa. www.gelest.com. Application procedures are found in the Gelest catalog, the contents of which are incorporated herein by reference Typically, to treat a particle with a chlorosilane, a 1-5 wt % solution is prepared in anhydrous alcohol or acetone solution. The particles are added in the same solvent, and mixed until HCl production is completed. Alkoxy silanes can be applied in a solution of 95:5 ethanol:water at pH 4-5. The silane is applied to the particles generally at a 2% concentration, stirred for a period of time, and the solvent removed. Generally, pretreated "silanated" particles are commercially available.

Any type of silica particle can be used in the compositions of the invention. The silica can be porous or non-porous and in particular can be treated with a silane to help improve hydrophobicity. Suitable silica particles are included as described in U.S. Pat. No. 6,683,126, the contents of which are included herein in their entirety.

The following paragraphs enumerated consequently from 1 through $O_1$ provide for various aspects of the present invention. In one embodiment, in a first paragraph (1), the present invention provides an ultra hydrophobic or super hydrophobic coating composition comprising a hydrophobic polymeric binder in combination with particles having a particle size of between about 1 nm to 25 microns.

2. The coating composition of the first paragraph, wherein the coating exhibits a water contact angle of at least about 120°.

3. The coating composition of the first paragraph, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

4. The coating composition of the third paragraph, wherein the particles can be pretreated with a silane.

5. The coating composition of any of first through fourth paragraphs, wherein the hydrophobic polymeric binder has a surface tension of less than about 50 mN/m.

6. The coating composition of any of paragraphs 1 through 4, wherein the polymeric binder is crosslinked interpolymerically.

7. The coating composition of paragraph 1, wherein the hydrophobic polymer is a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof.

8. An ultra hydrophobic or super hydrophobic coating composition comprising a hydrophobic polymeric binder in combination with particles having a particle size of between about 1 nm to 25 microns, wherein the hydrophobic polymeric binder is intrapolymerically or interpolymerically crosslinked with itself.

9. The coating composition of paragraph 8, wherein the coating exhibits a water contact angle of at least about 120°.

10. The coating composition of paragraph 8, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

11. The coating composition of paragraph 10, wherein the particles can be pretreated with a silane.

12. The coating composition of any of paragraphs 8 through 11, wherein the hydrophobic polymeric binder has a surface tension of less than about 50 mN/m.

13. The coating composition of paragraph 8, wherein the hydrophobic polymer is a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof.

14. An ultra hydrophobic or super hydrophobic coating composition comprising a polyvinyl ester polymeric binder in combination with particles having a particle size of between about 1 nm to 25 microns.

15. The coating composition of paragraph 14, wherein the coating exhibits a water contact angle of at least about 120°.

16. The coating composition of paragraph 14, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

17. The coating composition of paragraph 16, wherein the particles can be pretreated with a silane.

18. The coating composition of any of paragraphs 14 through 17, wherein the polyvinyl ester polymeric binder is crosslinked interpolymerically.

19. The coating composition of any of paragraph 14 through 18, wherein the polyvinyl ester polymeric binder is polyvinylcinnamate.

20. An ultra hydrophobic or super hydrophobic coating composition comprising a polyvinyl ester polymeric binder in combination with particles having a particle size of between about 1 nm to 25 microns, wherein the polyvinyl ester polymeric binder is interpolymerically crosslinked.

21. The coating composition of paragraph 20, wherein the coating exhibits a water contact angle of at least about 120°.

22. The coating composition of paragraph 20, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

23. The coating composition of paragraph 22, wherein the particles can be pretreated with a silane.

24. The coating composition of any of paragraphs 20 through 23, wherein the polyvinyl ester polymeric binder is polyvinylcinnamate.

25. An ultra hydrophobic or super hydrophobic coating composition comprising a polyvinylarylene/polyalkylene copolymeric binder in combination with particles having a particle size of between about 1 nm to 25 microns.

26. The coating composition of paragraph 25, wherein the coating exhibits a water contact angle of at least about 120°.

27. The coating composition of paragraph 25, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

28. The coating composition of paragraph 27, wherein the particles can be pretreated with a silane.

29. The coating composition of any of paragraphs 25 through 28, wherein the polyvinylarylene/polyalkylene copolymeric binder is crosslinked intrapolymerically or interpolymerically with itself.

30. The coating composition of any of paragraph 25 through 29, wherein the polyvinylarylene/polyalkylene copolymeric binder is a polystyrene/butadiene copolymer.

31. An ultra hydrophobic or super hydrophobic coating composition comprising a polyvinylarylene/polyalkylene copolymeric binder in combination with porous or non-porous particles having a particle size of between about 1 nm to 25 microns, wherein the polyvinyl ester polymeric binder is interpolymerically crosslinked.

32. The coating composition of paragraph 31, wherein the coating exhibits a water contact angle of at least about 120°.

33. The coating composition of paragraph 31, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

34. The coating composition of paragraph 33, wherein the particles can be pretreated with a silane.

35. The coating composition of any of paragraphs 31 through 34, wherein the polyvinylarylene/polyalkylene copolymeric binder is a polystyrene/butadiene copolymer.

36. An ultra hydrophobic or super hydrophobic composite comprising an ultra hydrophobic or super hydrophobic coating composition comprising a hydrophobic polymeric binder in combination with particles having a particle size of between about 1 nm to 25 microns; and a substrate.

37. The ultra hydrophobic or super hydrophobic composite of paragraph 36, wherein the coating exhibits a water contact angle of at least about 120°.

38. The ultra hydrophobic or super hydrophobic composite of paragraph 35, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

39. The ultra hydrophobic or super hydrophobic composite of paragraph 35, wherein the particles can be pretreated with a silane.

40. The ultra hydrophobic or super hydrophobic composite of any of paragraphs 36 through 39, wherein the hydrophobic polymeric binder has a surface tension of less than about 50 mN/m.

41. The ultra hydrophobic or super hydrophobic composite of any of paragraphs 36 through 39, wherein the polymeric binder is crosslinked interpolymerically.

42. The ultra hydrophobic or super hydrophobic composite of paragraph 36, wherein the hydrophobic polymer is a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof.

43. An ultra hydrophobic or super hydrophobic composite comprising a coating composition comprising a hydrophobic polymeric binder in combination with particles having a particle size of between about 1 nm to 25 microns, wherein the hydrophobic polymeric binder is interpolymerically crosslinked; and a substrate.

44. The ultra hydrophobic or super hydrophobic composite of paragraph 43, wherein the coating exhibits a water contact angle of at least about 120°.

45. The ultra hydrophobic or super hydrophobic composite of paragraph 43, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

46. The ultra hydrophobic or super hydrophobic composite of paragraph 45, wherein the particles can be pretreated with a silane.

47. The ultra hydrophobic or super hydrophobic composite of any of paragraphs 43 through 46, wherein the hydrophobic polymeric binder has a surface tension of less than about 50 mN/m.

48. The ultra hydrophobic or super hydrophobic composite of paragraph 43, wherein the hydrophobic polymer is a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof.

49. An ultra hydrophobic or super hydrophobic composite comprising a coating composition comprising a polyvinyl ester polymeric binder in combination with particles having a particle size of between about 1 nm to 25 microns; and a substrate.

50. The ultra hydrophobic or super hydrophobic composite of paragraph 49, wherein the coating exhibits a water contact angle of at least about 120°.

51. The ultra hydrophobic or super hydrophobic composite of paragraph 49, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

52. The ultra hydrophobic or super hydrophobic composite 51, wherein the particles can be pretreated with a silane.

53. The ultra hydrophobic or super hydrophobic composite of any of paragraphs 49 through 52, wherein the polyvinyl ester polymeric binder is crosslinked interpolymerically.

54. The ultra hydrophobic or super hydrophobic composite of any of paragraph 49 through 53, wherein the polyvinyl ester polymeric binder is polyvinylcinnamate.

55. An ultra hydrophobic or super hydrophobic coating composition comprising a polyvinyl ester polymeric binder in combination with particles having a particle size of between about 1 nm to 25 microns, wherein the polyvinyl ester polymeric binder is interpolymerically crosslinked; and a substrate.

56. The ultra hydrophobic or super hydrophobic composite of paragraph 55, wherein the coating exhibits a water contact angle of at least about 120°.

57. The ultra hydrophobic or super hydrophobic composite of paragraph 55, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

58. The ultra hydrophobic or super hydrophobic composite of paragraph 57, wherein the particles can be pretreated with a silane.

59. The ultra hydrophobic or super hydrophobic composite of any of paragraphs 55 through 58, wherein the polyvinyl ester polymeric binder is polyvinylcinnamate.

60. An ultra hydrophobic or super hydrophobic coating composition comprising a polyvinylarylene/polyalkylene copolymeric binder in combination with particles having a particle size of between about 1 nm to 25 microns; and a substrate.

61. The ultra hydrophobic or super hydrophobic composite of paragraph 60, wherein the coating exhibits a water contact angle of at least about 120°.

62. The ultra hydrophobic or super hydrophobic composite of paragraph 60, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

63. The ultra hydrophobic or super hydrophobic composite of paragraph 62, wherein the particles can be pretreated with a silane.

64. The ultra hydrophobic or super hydrophobic composite of any of paragraphs 60 through 63, wherein the polyvinylarylene/polyalkylene copolymeric binder is crosslinked interpolymerically.

65. The ultra hydrophobic or super hydrophobic composite of any of paragraph 60 through 64, wherein the polyvinylarylene/polyalkylene copolymeric binder is a polystyrene/butadiene copolymer.

66. An ultra hydrophobic or super hydrophobic coating composition comprising a polyvinylarylene/polyalkylene copolymeric binder in combination with particles having a particle size of between about 1 nm to 25 microns, wherein the polyvinyl ester polymeric binder is interpolymerically crosslinked; and a substrate.

67. The ultra hydrophobic or super hydrophobic composite of paragraph 66, wherein the coating exhibits a water contact angle of at least about 120°.

68. The ultra hydrophobic or super hydrophobic composite of paragraph 66, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

69. The ultra hydrophobic or super hydrophobic composite of paragraph 68, wherein the particles can be pretreated with a silane.

70. The ultra hydrophobic or super hydrophobic composite of any of paragraphs 66 through 69, wherein the polyvinylarylene/polyalkylene copolymeric binder is a polystyrene/butadiene copolymer.

71. The ultra hydrophobic or super hydrophobic composite of any of paragraphs through 36 through 70, wherein the substrate is a plastic (polyethylene, PVC, polystyrene, polyurethane, etc.), glass, wood, paper, ceramic or metal.

72. A method to coat a substrate, comprising the step of applying an ultra hydrophobic or super hydrophobic coating composition of any of paragraphs 1 through 35 to a substrate.

73. The method of paragraph 72, wherein the substrate is a plastic (polyethylene, PVC, polystyrene, polyurethane, etc.), glass, wood, paper, ceramic or metal.

74. The method of paragraph 73, further comprising the step of subjecting the coating composition to conditions suitable to effect interpolymeric crosslinking.

75. The method of paragraph 74, wherein the crosslinking is accomplished by thermal activation.

76. The method of paragraph 74, wherein the crosslinking is accomplished by radicals.

77. The method of paragraph 76, wherein the radicals are generated by a peroxide.

78. The method of paragraph 74, wherein the crosslinking is accomplished by photoaddition.

79. The method of paragraph 74, wherein the crosslinking is accomplished by a Diels-Alder reaction.

80. The method of paragraph 74, wherein the crosslinking is accomplished by generation of a nitrene.

81. An ultra hydrophobic or super hydrophobic coating composition comprising a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof as a polymeric binder in combination with particles having a particle size of between about 1 nm to 25 microns.

82. The coating composition of paragraph 81, wherein the coating exhibits a water contact angle of at least about 120°.

83. The coating composition of paragraph 81, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

84. The coating composition of paragraph 83, wherein the particles can be silanized.

85. The coating composition of any of paragraphs 81 through 84, wherein the hydrophobic polymeric binder has a surface tension of less than about 50 mN/m.

86. The coating composition of any of paragraphs 81 through 85, wherein the polymeric binder is crosslinked interpolymerically.

87. The coating of any of paragraphs 81 through 86, further comprising a substrate.

88. The coating of paragraph 87, wherein the substrate is a plastic, a natural polymer, a glass, a wood, a paper, a ceramic, a metal or a composite.

89. A method to prepare an ultra hydrophobic or super hydrophobic coated substrate comprising: contacting a substrate with a hydrophobic polyester, polyurethane or polyalkylene polymeric binder in combination with particles having a particle size of between about 1 nm to 25 microns to form a coating; and subjecting the coating to conditions sufficient to effect intermolecular crosslinking of the polymeric binder.

90. The method of paragraph 89, wherein the coating exhibits a water contact angle of at least about 120°.

91. The method of paragraph 89, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

92. The method of paragraph 91, wherein the particles can be silanized.

93. The method of any of paragraphs 89 through 92, wherein the hydrophobic polymeric binder has a surface tension of less than about 50 mN/m.

94. The method of any of paragraphs 89 through 93, wherein the conditions sufficient to effect intermolecular crosslinking of the polymeric comprise the use of an initiator.

95. The method of paragraph 94, wherein the initiator is a peroxide, peroxy compounds, benzoin derivatives, acetophenone derivatives, benzilketals, α-hydroxyalkylphenones, α-aminoalkylphenones, O-acyl α-oximinoketones, acylphosphine oxides, acylphosphonates, thiobenzoic S-esters, azo compounds, azide compounds, triazines, compounds with Si—Si bonds, biimidazoles, quinones, benzophenones, xanthones, thioxanthones, ketocoumarins, aromatic 1,2 diketones and phenylglyoxylates.

96. A substrate coated with an ultra hyhdrophobic or superhydrophobic composition comprising a hydrophobic polymer that is a homopolymer or copolymer of polyalkylene, polyacrylate, polymethacrylate, polyester, polyamide, polyurethane, polyvinylarylene, polyvinyl ester, a polyvinylarylene/alkylene copolymer, a polyalkyleneoxide or mixtures thereof as a polymeric binder in combination with particles having a particle size of between about 1 nm to 25 microns.

97. A substrate coated with an ultra hyhdrophobic or superhydrophobic composition of paragraph 96, wherein the coating exhibits a water contact angle of at least about 120°.

98. A substrate coated with an ultra hyhdrophobic or superhydrophobic composition of paragraph 97, wherein the particles are aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth) acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, or combinations thereof.

99. A substrate coated with an ultra hyhdrophobic or superhydrophobic composition of paragraph 98, wherein the particles can be silanized.

100. A substrate coated with an ultra hyhdrophobic or superhydrophobic composition of any of paragraphs 96 through 99, wherein the hydrophobic polymeric binder has a surface tension of less than about 50 mN/m.

101. A substrate coated with an ultra hyhdrophobic or superhydrophobic, wherein the substrate is a plastic, a natural polymer, a glass, a wood, a paper, a ceramic, a metal or a composite.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

Example 1

Polyisobutylmethacrylate (PIM) (181544, Aldrich Chemicals, St. Louis, Mo.): 23.26 g of polymer was added to 581.46 ml of a 48 mg/ml suspension of CAB-O-SIL TS-720 (Cabot Corp., Tuscola, Ill.) silica particles in tetrahydrofuran (THF), and dissolved by prolonged shaking at room temperature.

I. To 60 ml of the above polymer solution/particle suspension was added 25.7 mg (0.033 ml) of tert-butyl peroxide (168521, Aldrich, St. Louis, Mo.) and this formulation was thoroughly mixed by shaking. N-decyldimethylchlorosilane (Gelest, Inc., Morrisville, Pa.)-coated glass microscope slides were dip-coated in the formulation by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 40% of its original surface, while the non-crosslinked version (same coating formulation without tert-butyl peroxide crosslinker) was entirely washed away.

II. To 60 ml of the above polymer solution/particle suspension was added 64.2 mg of diphenyl(2,4,6-trimethylbenzoyl) phosphine oxide (TPO) (415952, Aldrich Chemicals, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 70% of the coated surface persisted as ultrahydrophobic, while the non-crosslinked version (same coating formulation without TPO crosslinker) was entirely washed away.

III. To 60 ml of the above polymer solution/particle suspension was added 96.9 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 80% of the coated surface persisted as ultrahydrophobic, while the non-crosslinked version (same coating formulation without benzophenone crosslinker) was entirely washed away.

IV. To 60 ml of the above polymer solution/particle suspension was added 26.4 mg of coumarin (Acros Organics, N.J., USA) and this formulation was thoroughly mixed by shaking. N-Decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 50% of the coated surface persisted as ultrahydrophobic, while the non-crosslinked version (same coating formulation without coumarin crosslinker) was entirely washed away.

V. To 30 ml of the above polymer solution/particle suspension was added 55.5 mg of anthraquinone (A9000, Aldrich Chemicals, St. Louis, Mo., USA) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 100% of the coated surface persisted as ultrahydrophobic, while the non-crosslinked version (same coating formulation without anthraquinone crosslinker) was entirely washed away.

VI. To 30 ml of the above polymer solution/particle suspension was added 59.6 mg of thioxanthen-9-one (TXO) (T34002, Aldrich Chemicals, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 95% of the coated surface persisted as ultrahydrophobic, while the non-crosslinked version (same coating formulation without TXO crosslinker) was entirely washed away.

VII. To 60 ml of the above polymer solution/particle suspension was added 29.2 mg of 2,2-azobis(2-methyl propionitrile) (AIBN) (Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were heated to 60-65° C. overnight. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without AIBN crosslinker) was entirely washed away.

Example 2

Polyisobutylene (BASF Corp., Florham park, NJ, MW=2,000,000): 18 grams of polymer was added to 450 ml of a 48 mg/ml suspension of CAB-O-SIL TS-720 (Cabot Corp., Tuscola, Ill.) silica particles in tetrahydrofuran (THF), and dissolved by prolonged shaking at room temperature. A portion of this was subsequently further diluted 6-fold, to approximately 6.67 mg/ml in THF, and used as follows:

A) Silanized Glass Slides:

I. To 60 ml of the above polymer solution/particle suspension was added 33.5 mg of benzophenone (Sigma-Aldrich, St. Louis, Mo.) and this formulation was thoroughly mixed by shaking. N-octyltrimethoxysilane (Dow Corning, Midland, Mich.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 50% of the coated surface persisted as ultrahydrophobic, while the non-crosslinked version (same coating formulation without benzophenone crosslinker) was entirely washed away.

II. To 60 ml of the above polymer solution/particle suspension was added 39.1 mg of anthraquinone (A90004, Aldrich Chemicals, St. Louis, Mo., USA) and this formulation was thoroughly mixed by shaking. N-octyltrimethoxysilane (Dow Corning, Midland, Mich.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 95% of the coated surface persisted as ultrahydrophobic, while the non-crosslinked version (same coating formulation without anthraquinone crosslinker) was entirely washed away.

III. To 60 ml of the above polymer solution/particle suspension was added 39.4 mg of thioxanthen-9-one (TXO) (T34002, Aldrich, St. Louis, Mo.) and this formulation was thoroughly mixed by shaking. N-octyltrimethoxysilane (Dow Corning, Midland, Mich.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 80% of the coated surface persisted as ultrahydrophobic, while the non-crosslinked version (same coating formulation without TXO crosslinker) was entirely washed away.

B) Aluminum Slides:

I. To 60 ml of the above polymer solution/particle suspension was added 33.5 mg of benzophenone (Sigma-Aldrich, St. Louis, Mo.) and this formulation was thoroughly mixed by shaking. Aluminum slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 40% of the coated surface persisted as ultrahydrophobic, while the non-crosslinked version (same coating formulation without benzophenone crosslinker) was entirely washed away.

II. To 60 ml of the above polymer solution/particle suspension was added 39.1 mg of anthraquinone (A90004, Aldrich Chemicals, St. Louis, Mo., USA) and this formulation was thoroughly mixed by shaking. Aluminum slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 40% of the coated surface persisted as ultrahydrophobic, while the non-crosslinked version (same coating formulation without anthraquinone crosslinker) was entirely washed away.

III. To 60 ml of the above polymer solution/particle suspension was added 39.4 mg of thioxanthen-9-one (TXO) (T34002, Aldrich, St. Louis, Mo.) and this formulation was thoroughly mixed by shaking. Aluminum slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 40% of the coated surface persisted as ultrahydrophobic, while the non-crosslinked version (same coating formulation without TXO crosslinker) was entirely washed away.

C) High-Density Polyethylene Slides:

I. To 60 ml of the above polymer solution/particle suspension was added 33.5 mg of benzophenone (Sigma-Aldrich, St. Louis, Mo.) and this formulation was thoroughly mixed by shaking. High-density polyethylene (HDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 100, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 70% of the coated surface persisted as ultrahydrophobic, while the non-crosslinked version (same coating formulation without benzophenone crosslinker) was entirely washed away.

II. To 60 ml of the above polymer solution/particle suspension was added 39.1 mg of anthraquinone (A90004, Aldrich Chemicals, St. Louis, Mo., USA) and this formulation was thoroughly mixed by shaking. High-density polyethylene (HDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 95% of the coated surface persisted as ultrahydrophobic, while the non-crosslinked version (same coating formulation without anthraquinone crosslinker) was entirely washed away.

III. To 60 ml of the above polymer solution/particle suspension was added 37.9 mg of 4-hydroxycyclohexyl phenyl ketone (HCPK) (405612, Aldrich Chemicals, St. Louis, Mo.) and this formulation was thoroughly mixed by shaking. High-density polyethylene (HDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without HCPK crosslinker) was entirely washed away.

IV. To 60 ml of the above polymer solution/particle suspension was added 39.4 mg of thioxanthen-9-one (TXO) (T34002, Aldrich, St. Louis, Mo.) and this formulation was thoroughly mixed by shaking. High-density polyethylene (HDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 85% of the coated surface persisted as ultrahydrophobic, while the non-crosslinked version (same coating formulation without TXO crosslinker) was entirely washed away.

D) Low-Density Polyethylene Slides:

I. To 60 ml of the above polymer solution/particle suspension was added 29.2 mg of 2,2-azobis(2-methyl propionitrile) (AIBN, Aldrich, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were heated to 60-65° C. overnight. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 90% of the coated surface persisted as ultrahydrophobic, while the non-crosslinked version (same coating formulation without AIBN crosslinker) was almost entirely washed away.

II. To 60 ml of the above polymer solution/particle suspension was added 33.5 mg of benzophenone (Sigma-Aldrich, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 100, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 90% of the coated surface persisted as ultrahydrophobic, while the non-crosslinked version (same coating formulation without benzophenone crosslinker) was almost entirely washed away.

III. To 60 ml of the above polymer solution/particle suspension was added 39.1 mg of anthraquinone (A90004, Aldrich Chemicals, St. Louis, Mo., USA) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nM) (Harland Medical UVM400, Eden Prairie, Minn.) for 5 minutes. This process created a surface on which water droplets would not cling at an angle of 100, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 100% of the coated surface persisted as ultrahydrophobic, while the non-crosslinked version (same coating formulation without anthraquinone crosslinker) was almost entirely washed away.

IV. To 60 ml of the above polymer solution/particle suspension was added 37.9 mg of 4-hydroxycyclohexyl phenyl ketone (HCPK) (405612, Aldrich Chemicals, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without HCPK crosslinker) was almost entirely washed away.

V. To 60 ml of the above polymer solution/particle suspension was added 39.4 mg of thioxanthen-9-one (TXO) (T34002, Aldrich, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 85% of the coated surface persisted as ultrahydrophobic, while the non-crosslinked version (same coating formulation without TXO crosslinker) was almost entirely washed away.

E) Polypropylene Slides:

I. To 60 ml of the above polymer solution/particle suspension was added 33.5 mg of benzophenone (Sigma-Aldrich, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 50% of the coated surface persisted as ultrahydrophobic, while the non-crosslinked version (same coating formulation without benzophenone crosslinker) was almost entirely washed away.

II. To 60 ml of the above polymer solution/particle suspension was added 39.1 mg of anthraquinone (A90004, Aldrich Chemicals, St. Louis, Mo., USA) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 70% of the coated surface persisted as ultrahydrophobic, while the non-crosslinked version (same coating formulation without anthraquinone crosslinker) was almost entirely washed away.

III. To 60 ml of the above polymer solution/particle suspension was added 39.4 mg of thioxanthen-9-one (TXO) (T34002, Aldrich, St. Louis, Mo.) and this formulation was thoroughly mixed by shaking. Low-density polyethylene (LDPE, McMaster-Carr, Chicago, Ill.) slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating was ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without TXO crosslinker) was almost entirely washed away.

Example 3

Polyvinylneononanoate (Cat #930, Scientific Products, Inc., Ontario, N.Y.): 8.01 grams of polymer was added to 200 ml of a 48 mg/ml suspension of CAB-O-SIL TS-720 (Cabot Corp., Tuscola, Ill.) silica particles in methyl ethyl ketone, and dissolved by prolonged shaking at room temperature.

To 60 ml of the above polymer solution/particle suspension was added 97.5 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 50% of its original surface, while the non-crosslinked version (same coating formulation without benzophenone crosslinker) was almost entirely washed away in the THF.

Example 4

Polyvinylcinnamate (Cat #02648, Polysciences, Inc., Warrington, Pa.): 8.01 grams of polymer was added to 200 ml of a 48 mg/ml suspension of CAB-O-SIL TS-720 (Cabot Corp., Tuscola, Ill.) silica particles in tetrahydrofuran (THF), and dissolved by prolonged shaking at room temperature.

I. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 80% of its original surface.

II. To 60 ml of the above polymer solution/particle suspension was added 98.4 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 90% of its original surface, while the non-crosslinked version (same coating formulation without benzophenone crosslinker) was almost 80% intact.

Example 5

Polystyrene (182427, Aldrich Chemicals, St. Louis, Mo.): 8.02 grams of polymer was added to 200 ml of a 48 mg/ml suspension of CAB-O-SIL TS-720 (Cabot Corp., Tuscola, Ill.) silica particles in tetrahydrofuran (THF), and dissolved by prolonged shaking at room temperature.

I. To 30 ml of the above polymer solution/particle suspension was added 55.4 mg of anthraquinone (A90004, Aldrich Chemicals, St. Louis, Mo., USA) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 70% of its original surface, while the non-crosslinked version (same coating formulation without anthraquinone crosslinker) was approximately 80% washed away.

II. To 30 ml of the above polymer solution/particle suspension was added 56.2 mg of 4-hydroxycyclohexyl phenyl ketone (HCPK) (405612, Aldrich Chemicals, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 80% of its original surface, while the non-crosslinked version (same coating formulation without HCPK crosslinker) was approximately 80% washed away.

III. To 30 ml of the above polymer solution/particle suspension was added 56.2 mg of thioxanthen-9-one (TXO) (T34002, Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 95% of its original surface, while the non-crosslinked version (same coating formulation without TXO crosslinker) was approximately 80% washed away.

Example 6

Styrene/butadiene (Cat #451, Scientific Products, Inc., Ontario, N.Y.): 20 grams of polymer was added to 500 ml of a 48 mg/ml suspension of CAB-O-SIL TS-720 (Cabot Corp., Tuscola, Ill.) silica particles in tetrahydrofuran (THF), and dissolved by prolonged shaking at room temperature.

I. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 90% of its original surface, while the non-crosslinked version (same coating formulation without UV irradiation) was entirely washed away.

II. To 60 ml of the above polymer solution/particle suspension was added 95.5 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 100% of its original surface, while the non-crosslinked version (same coating formulation without benzophenone crosslinker or UV irradiation) was entirely washed away.

III. To 60 ml of the above polymer solution/particle suspension was added 110.4 mg of anthraquinone (A90004, Aldrich Chemicals, St. Louis, Mo., USA) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 100% of its original surface, while the non-crosslinked version (same coating formulation without anthraquinone crosslinker or UV irradiation) was entirely washed away.

IV. To 60 ml of the above polymer solution/particle suspension was added 109.9 mg of 4-hydroxycyclohexyl phenyl ketone (HCPK) (405612, Aldrich Chemicals, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 100% of its original surface, while the non-crosslinked version (same coating formulation without HCPK crosslinker or UV irradiation) was entirely washed away.

V. To 60 ml of the above polymer solution/particle suspension was added 114.9 mg of thioxanthen-9-one (TXO (T34002, Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment the coating remained ultrahydrophobic over approximately 100% of its original surface, while the non-crosslinked version (same coating formulation without TXO crosslinker or UV irradiation) was entirely washed away.

Example 7

Nylon 6,6 poly(hexamethylene adipamide) (Nylon 6/6) (429171, Aldrich Chemicals, St. Louis, Mo.): 6.4 grams of polymer was added to 160 ml of a 48 mg/ml suspension of CAB-O-SIL TS-720 (Cabot Corp., Tuscola, Ill.) silica particles in trifluoroethanol (TFE), and dissolved by prolonged shaking at room temperature. A portion of this was subsequently further diluted 2-fold, to 20 mg/ml in TFE, and used as follows:

I. To 30 ml of the above polymer solution/particle suspension was added 47.6 mg of benzophenone (Sigma-Aldrich, St. Louis, Mo.) and this formulation was thoroughly mixed by shaking, then bath-sonicated for 20 minutes at 40° C. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in trichloroethanol (TCE), and then air-dried. After this treatment the coating remained ultrahydrophobic over approximately 70% of its original surface, while the non-crosslinked version (same coating formulation without benzophenone crosslinker) was approximately 50% washed away.

II. To 30 ml of the above polymer solution/particle suspension was added 57.7 mg of thioxanthen-9-one (TXO) (T34002, Aldrich, St. Louis, Mo.) and this formulation was thoroughly mixed by shaking, then bath-sonicated for 20 minutes at 40° C. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying for 5 minutes at room temperature, the coated slides were irradiated with UV light (300-400 nm) for 5 minutes (Harland Medical UVM400, Eden Prairie, Minn.). This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in trichloroethanol (TCE), and then air-dried. After this treatment the coating remained ultrahydrophobic over approximately 65% of its original surface, while the non-crosslinked version (same coating formulation without TXO crosslinker) was approximately 50% washed away.

Example 8

Polycaprolactone (PCL) (440744, Aldrich Chemicals, Milwaukee, Wis.): 18 grams of polymer was added to 450 ml of a 48 mg/ml suspension of CAB-O-SIL TS-720 (Cabot Corp., Tuscola, Ill.) silica particles in tetrahydrofuran (THF), and dissolved by prolonged shaking at room temperature.

To 60 ml of the above polymer solution/particle suspension was added 98.7 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 90% of the coated surface persisted as ultrahydrophobic, while the non-crosslinked version (same coating formulation without benzophenone crosslinker) was entirely washed away.

Example 9

Polyoctadecylmethylsiloxane (PODS) (ALT-192, Gelest, Inc., Morrisville, Pa.): 18 grams of polymer was added to 450 ml of a 48 mg/ml suspension of CAB-O-SIL TS-720 (Cabot Corp., Tuscola, Ill.) silica particles in tetrahydrofuran (THF), and dissolved by prolonged shaking at room temperature.

I. To 60 ml of the above polymer solution/particle suspension was added 96.7 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without benzophenone crosslinker) was almost entirely washed away.

II. To 60 ml of the above polymer solution/particle suspension was added 26.2 mg of coumarin (110530050, Acros Organics, N.J.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 60% of the coated surface persisted as ultrahydrophobic, while the non-crosslinked version (same coating formulation without coumarin crosslinker) was almost entirely washed away.

III. To 60 ml of the above polymer solution/particle suspension was added 25.7 mg of tert-butyl peroxide (168521, Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 50% of the coated surface persisted as ultrahydrophobic, while the non-crosslinked version (same coating formulation without tert-butyl peroxide crosslinker) was almost entirely washed away.

IV. To 60 ml of the above polymer solution/particle suspension was added 29.2 mg of 2,2-azobis(2-methyl propionitrile) (AIBN) (Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in THF, and then air-dried. After this treatment approximately 50% of the coated surface persisted as ultrahydrophobic, while the non-crosslinked version (same coating formulation without AIBN crosslinker) was almost entirely washed away.

Example 10

Ethylcellulose (Sigma-Aldrich, St. Louis, Mo.): 17.83 grams of polymer was added to 444 ml of a 48 mg/ml suspension of CAB-O-SIL TS-720 (Cabot Corp., Tuscola, Ill.) silica particles in chloroform, and dissolved by prolonged shaking at room temperature.

I. To 60 ml of the above polymer solution/particle suspension was added 98.9 mg of benzophenone (Sigma-Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in chloroform, and then air-dried. After this treatment approximately 50% of the coated surface persisted as ultrahydrophobic, while the non-crosslinked version (same coating formulation without benzophenone crosslinker) was entirely washed away.

II. To 60 ml of the above polymer solution/particle suspension was added 110.8 mg of anthraquinone (A90004, Aldrich Chemicals, St. Louis, Mo., USA) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in chloroform, and then air-dried. After this treatment approximately 80% of the coated surface persisted as ultrahydrophobic, while the non-crosslinked version (same coating formulation without anthraquinone crosslinker) was entirely washed away.

III. To 60 ml of the above polymer solution/particle suspension was added 115.4 mg of thioxanthen-9-one (TXO) (T34002, Aldrich, St. Louis, Mo.) and this formulation was thoroughly mixed by shaking. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. 0 After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in chloroform, and then air-dried. After this treatment approximately 80% of the coated surface persisted as ultrahydrophobic, while the non-crosslinked version (same coating formulation without TXO crosslinker) was entirely washed away.

Example 11

Tecoflex Polyurethane (SG-60D, CD67RB091, Noveon, Cleveland, Ohio): 6.4 grams of polymer was added to 160 ml of a 48 mg/ml suspension of CAB-O-SIL TS-720 (Cabot Corp., Tuscola, Ill.) silica particles in trifluoroethanol (TFE), and dissolved by prolonged shaking at room temperature.

Coated slides were then sonicated on a probe sonicator (Sonicator XL, Misonix, Inc., Farmingdale, N.Y.) for 1 minute in trichloroethanol (TCE), and then air-dried. After this treatment approximately 80% of the coated surface persisted as ultrahydrophobic, while the non-crosslinked version (same coating formulation without benzophenone crosslinker) was almost entirely washed away.

II. To 30 ml of the above polymer solution/particle suspension was added 58.2 mg of anthraquinone (A90004, Aldrich Chemicals, St. Louis, Mo., USA) and this formulation was thoroughly mixed by shaking, then bath-sonicated for 10 minutes at room temperature. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in trichloroethanol (TCE), and then air-dried. After this treatment approximately 60% of the coated surface persisted as ultrahydrophobic, while the non-crosslinked version (same coating formulation without anthraquinone crosslinker) was almost entirely washed away.

III. To 30 ml of the above polymer solution/particle suspension was added 58.3 mg of thioxanthen-9-one (TXO) (T34002, Aldrich, St. Louis, Mo.) and this formulation was thoroughly mixed by shaking, then bath-sonicated for 10 minutes at room temperature. N-decyldimethylchlorosilane (Gelest, Inc., Morrisville, Pa.)-coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

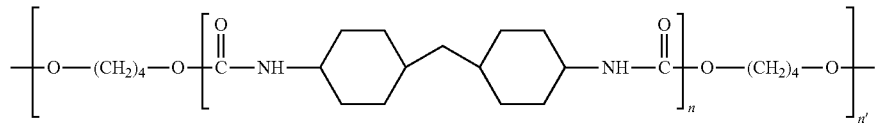

Tecoflex Polyurethane SG-60D, a mixture of cylic polyurethane.s

A portion of this was subsequently further diluted 2-fold, to 20 mg/ml in TFE, and used as follows:

I. To 30 ml of the above polymer solution/particle suspension was added 48.7 mg of benzophenone (Sigma-Aldrich, St. Louis, Mo.) and this formulation was thoroughly mixed by shaking, then bath-sonicated for 10 minutes at room temperature. N-decyldimethylchlorosilane (Gelest, Inc., Morrisville, Pa.)—coated glass microscope slides were dip-coated in the polymer solution/particle suspension by immersing for 30 seconds, then withdrawing at 0.5 cm/sec. After air-drying the coated slides for 5 minutes at room temperature, they were irradiated with UV light (300-400 nm) (Harland Medical UVM400, Eden Prairie, Minn.) for 5 minutes. This process created a surface on which water droplets would not cling at an angle of 10°, indicating the coating is ultrahydrophobic.

Coated slides were then sonicated on a probe sonicator (Sonicator XL, Misonix, Inc., Farmingdale, N.Y.) for 1 minute in trichloroethanol (TCE), and then air-dried. After this treatment approximately 65% of the coated surface persisted as ultrahydrophobic, while the non-crosslinked version (same coating formulation without TXO crosslinker) was almost entirely washed away.

Example 12

Polycaprolactone average molecular weight 80,000 (Sigma-Aldrich, St. Louis Mo.).

2.0 grams of polymer was dissolved in 100 mL tetrahydrofuran (Fisher Scientific, Pittsburgh, Pa.) to which 3.0 grams of Aeroxide LE 3, hydrophobic fumed silica (Essen, Germany) was added. The suspension was mixed by prolonged shaking at room temperature to provide a stock solution.

I. To 10 mL of the above stock solution was added 50 milligrams of 10,10'-bis(10-phenyl-10H-phenoxasilin (Sigma-Aldrich, St. Louis Mo.) and this formulation was thoroughly mixed by shaking. Aluminum 2024 (1 cm×3 cm×0.032" thick) and high density polyethylene (HDPE) (1 cm×3 cm×1/16" thick) (McMaster-Carr, Elmhurst, Ill.) were cleaned by twice wiping in acetone and immersing in acetone and sonicating 5 minutes followed by acetone rinse. The aluminum and HDPE were dip-coated in the polymer solution/particle suspension (stock solution) by immersing for 1 minute, then withdrawing at 0.33 cm/sec. After drying in an oven at 65 degrees centigrade for 5 minutes, they were irradiated with UV light (300-400 nm) (Harland Medical UVM400, Eden Prairie, Minn.) for 5 minutes. The process created a surface on which water droplets would not cling at an angle of 10 degrees, indicating the coating is ultrahydrophobic.

Coated slides were then sonicated in tetrahydrofuran in an ultrasonic cleaning system 2014 (L&R Manufacturing Systems, Kearny, N.J.) for 10 seconds and then air dried. After this treatment the coating remained ultrahydrophobic over approximate 75% of the original HDPE coated surface and 40% of the aluminum coated surface while the non-crosslinked formulation (same formulation without initiator) was entirely washed away.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. An ultrahydrophobic or superhydrophobic coating composition selected from the group of a homopolymer or copolymer of a polyalkylene, a polyacrylate, a polymethacrylate, a polyester, a polyamide, a polyurethane, a polyvinylarylene, a polyvinyl ester, a polyvinylarylene/alkylene copolymer, a polyalkyleneoxide or mixtures thereof, as polymeric binder in combination with particles having a particle size of between about 1 nm to 25 microns and a radical-generating initiator compound,
wherein the polymer has less than 1 mole percent alkylenic reactive sites of unsaturation.

2. The coating composition of claim 1, wherein the coating exhibits a water contact angle of at least about 120°.

3. The coating composition of claim 1, wherein the particles are selected from the group of aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylate particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles, biodegradable particles, polycaprolactone (PCL), polylactideglycolide (PLGA), nanofibers, nanotubes, nanowires, or combinations thereof.

4. The coating composition of claim 3, wherein the particles can be silanized.

5. The coating composition of claim 1, wherein the polymeric binder has a surface tension of less than about 50 mN/m.

6. A substrate coated with an ultrahydrophobic or a superhydrophobic composition comprising a polymer that is a homopolymer or copolymer selected from the group of a polyalkylene, a polyacrylate, a polymethacrylate, a polyester, a polyamide, a polyurethane, a polyvinylarylene, a polyvinyl ester, a polyvinylarylene/alkylene copolymer, a polyalkyleneoxide or mixtures thereof as a polymeric binder in combination with particles having a particle size of between about 1 nm to 25 microns and a radical-generating initiator compound,
wherein the polymer has less than 1 mole percent alkylenic reactive sites of unsaturation.

7. The substrate coated with an ultrahydrophobic or a superhydrophobic composition of claim 6, wherein the coating exhibits a water contact angle of at least about 120°.

8. The substrate coated with an ultrahydrophobic or a superhydrophobic composition of claim 7, wherein the particles are selected from the group of aluminum oxides (alumina), titanium oxide, zirconium oxide, gold (treated with organo thiols), silver (organo thiol or silane treated), nickel, nickel oxide, iron oxide, and alloys (all treated with silane), polystyrene particles, (meth)acrylate particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles biodegradable particles, polycaprolactone (PCL), polylactideglycolide (PLGA), nanofibers, nanotubes, nanowires, or combinations thereof.

9. The substrate coated with an ultrahydrophobic or a superhydrophobic composition of claim 8, wherein the particles are pretreated with a silane.

10. The substrate coated with an ultrahydrophobic or a superhydrophobic composition claim 6, wherein the polymeric binder has a surface tension of less than about 50 mN/m.

11. The substrate coated with an ultrahydrophobic or a superhydrophobic composition of claim 6, wherein the substrate is selected from the group of a plastic, a natural polymer, a glass, a wood, a paper, a ceramic, a metal, a composite or mixtures thereof.

12. The substrate of claim 6, wherein the surface can be pretreated to promote adhesion of the ultra hydrophobic ultrahydrophobic or superhydrophobic coating to the substrate.

13. The coating composition of claim 1, wherein the radical generating initiator compound is selected from the group of a peroxide, peroxy compound, benzoin derivative, acetophenone derivative, benzilketal, α-hydroxyalkylphenone, α-aminoalkylphenone, O-acyl α-oximinoketone, acylphosphine oxide, acylphosphonate, thiobenzoic S-ester, azo compound, azide compound, triazine, compound with at least one Si—Si bond, biimidazole, quinone, benzophenone, xanthone, thioxanthone, ketocoumarin, aromatic 1,2 diketone, phenylglyoxylate, anthraquinone, anthrone, anthrone-like heterocycle, aryl ketone, acridone, redox reagent, organic hydroperoxide, metal alkyl, organometallic reagent or mixtures thereof.

14. The substrate of claim 11, wherein the substrate is a plastic comprising polypropylene or polystyrene.

15. The substrate of claim 11, wherein the substrate is a fabric.

16. The substrate coated with an ultrahydrophobic or superhydrophobic composition of claim 6, wherein the coating composition is crosslinked.

17. A cured ultrahydrophobic or superhydrophobic coating, composition selected from the group of a homopolymer or copolymer of a polyalkylene, a polyacrylate, a polymethacrylate, a polyester, a polyamide, a polyurethane, a polyvinylarylene, a polyvinyl ester, a polyvinylarylene/alkylene copolymer, a polyalkyleneoxide or mixtures thereof, as a cured polymeric binder in combination with particles having a particle size of between about 1 nm to 25 microns, wherein the curing was effected by a radical-generating initiator compound contained within the uncured polymeric binder and wherein the uncured polymeric binder had less than 1 mole percent alkylenic reactive sites of unsaturation.

* * * * *